J. B. MUÑIZ.
SIGNALING DEVICE FOR VEHICLES.
APPLICATION FILED SEPT. 23, 1919.
1,375,720.
Patented Apr. 26, 1921.
2 SHEETS—SHEET 2.
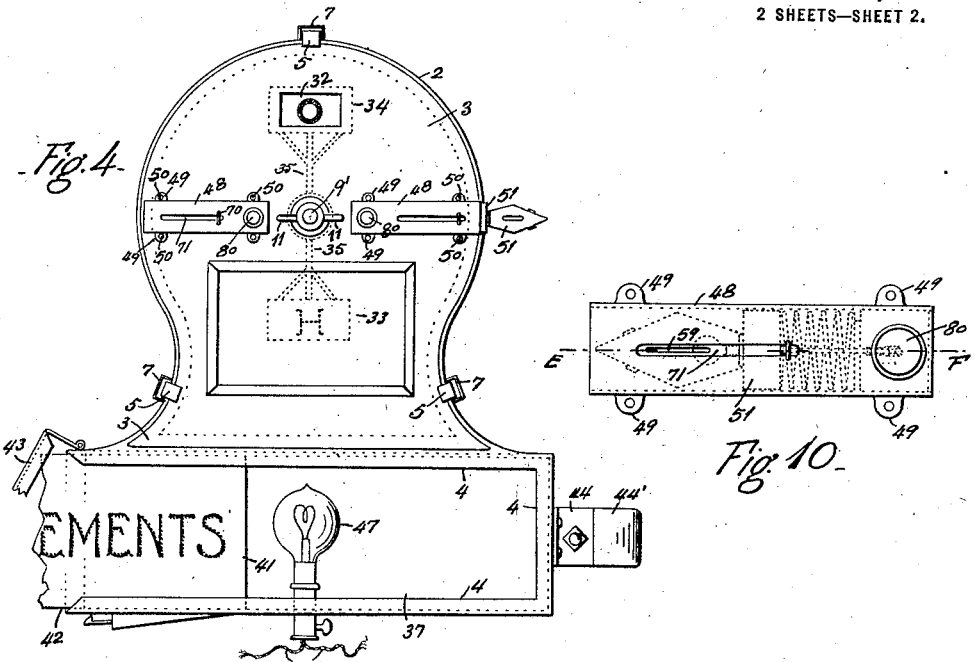
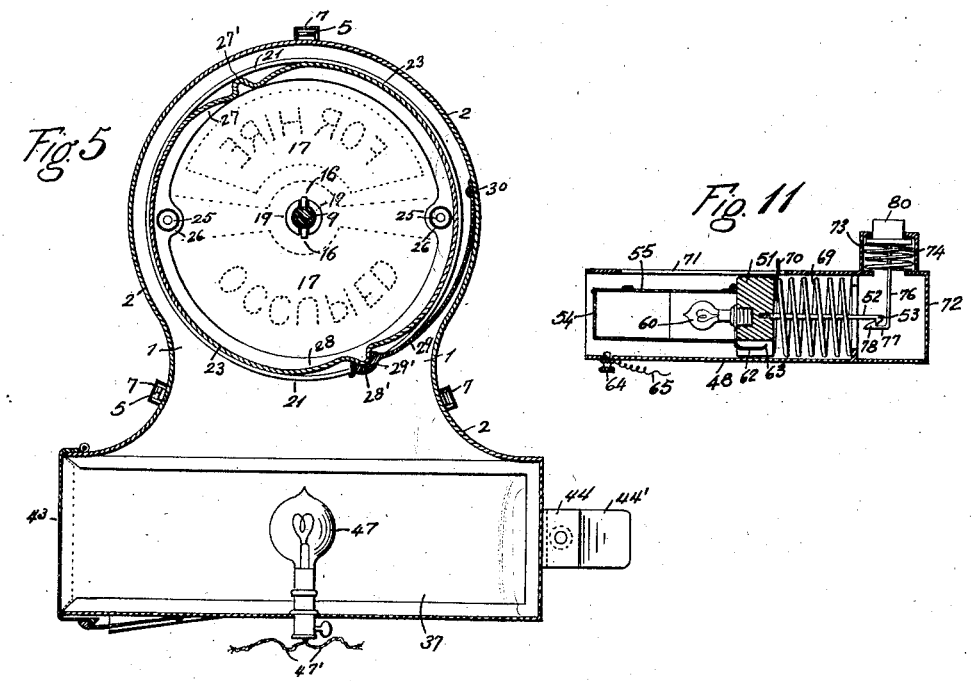

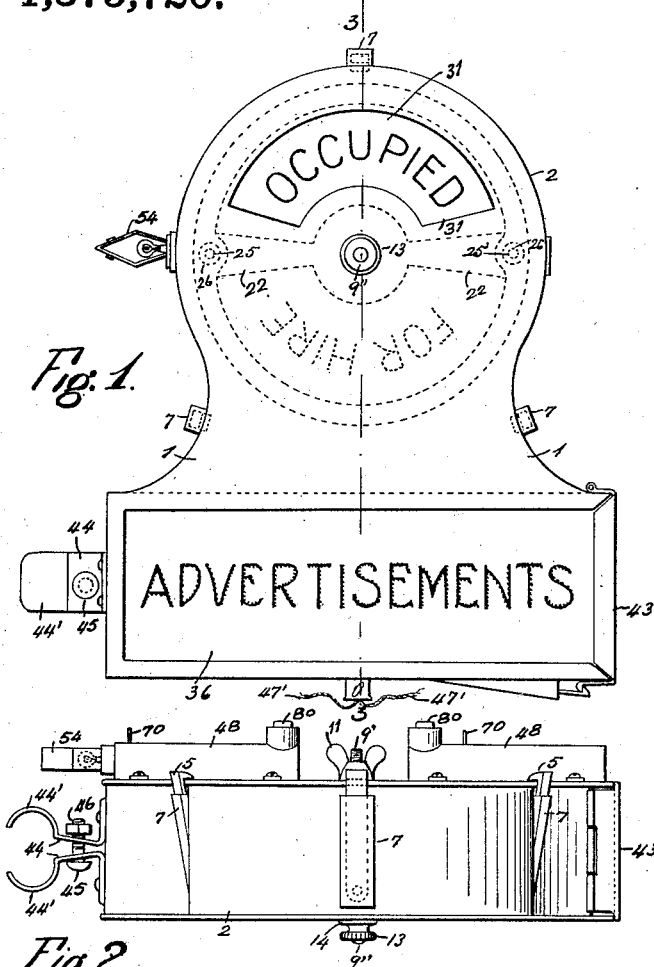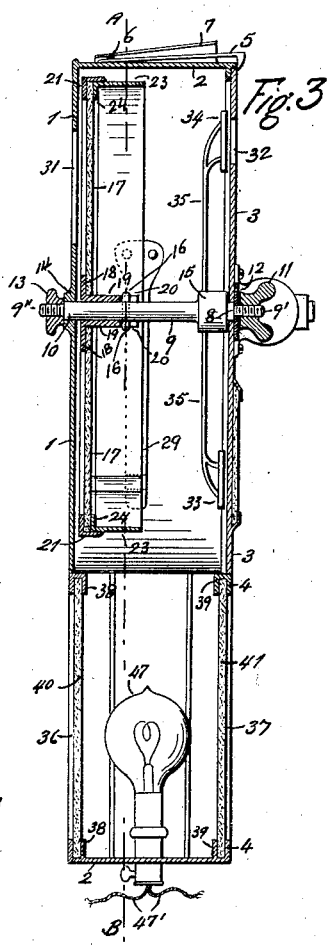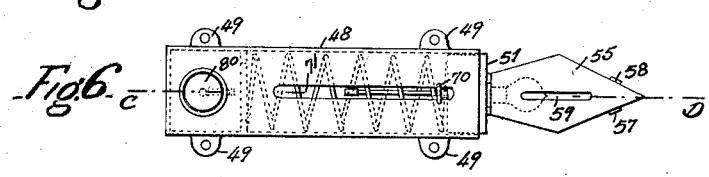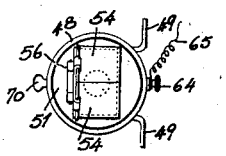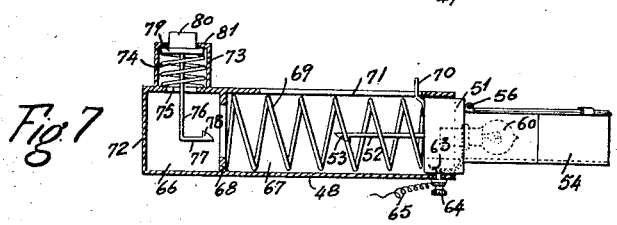

UNITED STATES PATENT OFFICE.

JESUS B. MUÑIZ, OF HABANA, CUBA.

SIGNALING DEVICE FOR VEHICLES.

1,375,720.

Specification of Letters Patent. Patented Apr. 26, 1921.

Application filed September 23, 1919. Serial No. 325,663.

*To all whom it may concern:*

Be it known that I, JESUS B. MUÑIZ, subject of the King of Spain, and resident of Habana, Cuba, (whose post-office address is No. 55 Neptuno street, Habana, Cuba,) have invented certain new and useful Improvements in Signaling Devices for Vehicles, of which the following is a specification.

This invention relates to the devices used for making signals from the vehicles, particularly automobiles, to the passers-by. An object thereof is to provide a device to call the attention of the passer-by that the vehicle is hired or free and liable to be hired, which is very convenient, particularly during the night time when it is not possible to observe the sign at present in use for such purpose, whereby this invention provides lighting means in combination with a rotatory sign in order to make the signal wholly visible at a distance.

And another object of the invention is to provide an indicator of the change of travel direction of a vehicle to the right or to the left when coming near the corners or crossways of the streets, which is advantageous for the passer-by and for the other vehicles traveling behind since thereby many accidents will be prevented.

In the annexed drawings:

Figure 1 is a front elevation of the indicator for vehicles forming the subject-matter of this invention.

Fig. 2 is an upper view thereof.

Fig. 3 is an enlarged vertical transverse section thereof on line 3—3 of Fig. 1.

Fig. 4 is a rear elevation of the device, showing partially taken off one of the lower advertisement plates and cut off the side cover.

Fig. 5 is a vertical section on line A—B (Fig. 3).

Fig. 6 is a rear elevation of the device indicating the change of direction to the right or left, showing the arrow in its horizontal position.

Fig. 7 is a horizontal section thereof on line C—D (Fig. 6).

Fig. 8 is a view of the same indicator shown in Fig. 6, looking by its end D.

Fig. 9 is a perspective view of the arrow-shaped casing, separated from inside the indicating device so as to show its details.

Fig. 10 is an enlarged view of the same direction indicator showing the arrow in its retained position.

Fig. 11 is a horizontal section of the same device on line E—F of Fig. 10.

Assuming a device comprising a narrow casing, preferably made of metal plate and provided with a front wall 1 of round shape at its upper portion and of rectangular shape at its lower portion and having a perpendicular flange 2 all around the same which constitutes the upper, lateral and lower walls of the casing, one of the improvements of this invention consists in making detachable the door 3 instead of being secured with hinges, so that it may cover only the upper round portion of the casing, closing rearwardly the lower portion of the casing by means of a fixed frame 4 formed by a flange bent on the lateral and lower walls 2 of the casing, and said door 3 is secured in position by means of three equidistant spring clamps 5 secured by means of a rivet 6 on the upper and lateral walls 2 of the casing inside recesses of pyramidal section 7 formed by additional plates welded outside those walls of the casing. The door 3 is provided with a central opening 8 through which passes the horizontal shaft 9 which is mounted on said opening and on opening 10 of the front wall 1 of the casing and it ends in projecting threaded portions 9′ and 9″ on which are screwed respectively a wing nut 11 on a washer 12 and a plain nut 13 on a circular projection 14 formed on the outer face of the front wall 1, and said shaft 9 is provided with a collar 15 behind the door 3 so as to act as a stop thereto, and besides at its central portion said shaft 9 is provided with two diametrally opposite lugs 16 which serve to secure upon said shaft a disk 17 bearing the signs "For hire" and "Occupied," to which effect the disk 17 which is of transparent material is fixed against a flange 18 projecting from a sleeve 19 mounted on shaft 9 and which presents at its end two longitudinal slots diametrally opposite 20 in which fit longitudinally the lugs 16 of shaft 9. Said disk 17 is preferably divided in two halves which are held at its border between an annular plate 21 which is on the same vertical plane as the flange 18 of sleeve 19 and is connected thereto by means of two opposite radial arms 22 and an annular ring 23 provided with a flange 24 mounting on disk 17, the flange 24 of ring 23 and the flange of the annular plate 21 being secured together by means of two threaded stems diametrally opposite 25 projecting from the annular plate 21 and which pass through the halves of disk 17 at its junction and of the flange 24 of ring 23 and on whose projecting ends nuts 26 are screwed. Said ring 23 presents undulated portions diametrally opposite 27 and 28 which constitute central shoulders 27' and 28' which act as springs to engage either of the shoulders in the rotary movement of disk 17 with a corresponding recess 29' formed at the inner face of a curved spring plate 29 secured by a rivet 30 to a lateral wall 2 of the casing and which acts to fix the disk 17 in either one of the positions required to display either of the signs "For hire" and "Occupied" from the front portion of the casing through the opening 31 in form of annular segment which presents the front wall 1 of said casing. These positions are determined toward the rear portion of the casing through the rectangular opening 32 of door 3 by means of two plates 33 and 34 which have stamped or cut thereon the initials "H" and "O" of the words "Hire" and "Occupied" respectively or any other conventional characters, and whose plates are secured on the ends of radial arms diametrally opposite 35 leading from the collar 15 of shaft 9, said plates 33 and 34 corresponding transversally with the position of said signs in the disk 17.

At the lower portion of the casing are provided in the rear and front walls thereof large openings 36 and 37 to the inside of the frame of which are fixed flanges 38 and 39 forming guides for lodging plates of transparent material 40 and 41 which are introduced from the outside through an opening 42 formed in one of the lateral walls 2 and which is closed by means of a hinged cover 43. On the opposite side wall 2 firmly closed is fixed a bracket which can be of any construction and which consists of two spring plates 44 secured with rivets on said wall 2 and which have their outer ends 44' of arched shape opposite to one another, the same being adjustable on any supporting bar by means of a screw 45 passing through holes in said plates 44 and a nut 46 screwed on said screw.

The inner lighting of the casing is done by a single electric lamp 47 whose socket is fixed through the bottom 2 of the casing and whose conductors 47' lead to the outside.

Secured behind the cover 3 to one side and the other and following the direction of its horizontal diameter are arranged the indicators of direction to the right or to the left respectively, similar and arranged in opposite sense, each one being formed by a cylindrical casing 48 provided with four vertical lugs 49 through which pass bolts 50 which secure the casing to said cover 3. Inside cylinder 48 is slidably mounted a plunger 51 provided with a stem 52 at its inner face, which is alined with the axis thereof and terminates in a pawl 53.

The outer face of the plunger has secured thereto a casing 54 of metallic plate in the shape of an arrow, one of whose walls, the front one, is of a transparent material and the rear cover wall 55 is movable on a hinge 56, this cover being provided with two arched flanges 57 and 58 which permit the closure thereof to casing 54. This cover 55 is provided with a slot 59 through which is seen an electric lamp 60 lodged inside the casing and whose socket is secured to the plunger 51 and its terminals are in contact with the sheet 61 which leading from the outer face of plunger 51 is bent to follow the direction of its axis to the inside of a groove 62 provided at the side face of said plunger, the extremity 63 of said sheet being slightly bent inward and arranged to come in contact with a button 64 passing through cylinder 48. From said button 64 lead the conductors 65 of an electrical generator.

Cylinder 48 is divided in two chambers 66 and 67 by a partition wall 68 of annular section, the chamber 67 being of greater length than chamber 66. In chamber 67 is lodged a helical spring 69 which rests on the partition wall 68 and on the inner face of the plunger wherein is secured a butt 70 to actuate said plunger from the outside and which slides in a longitudinal slot 71 provided in casing 48. Very close to the end wall 72 of casing 48 and perpendicular to the axis of this casing there is integral therewith the cylinder casing 73, which is smaller than the former and within which is lodged the helical spring 74 which rests at one end on the wall of casing 48, having a perforation 75 to let the free entrance of a stem 76 passing through the spring 74 and which is bent in right angle following the direction of the shaft of cylinder 48, its end terminating in the pawl 78. This stem is fixed at the center of the projecting base 79 of button 80 against which bears the other end of the helical spring 74. The end wall 81 of casing 73 has a central circular perforation of the same diameter as the button 80 and through such perforation passes out the button 80. Normally the arrow 54 remains unseen inside the casing 48, when the pawl 53 engages the pawl 78.

In order to indicate if the vehicle provided with this device is already hired or free to be hired, it is only required to rotate the disk 17 until one of the shoulders 27' or 28' of the movable annular ring 23 may fit in the recess 29' of the fixed arched plate 29, to which effect it is only necessary to grasp with the fingers the wing nut 11 and to impart thereto a rotating motion carrying therewith the shaft 9.

In order to dismount the casing for taking off the disk 17, it is only necessary to firstly separate the nut 13 and thence pulling out the clamps 5, the door 3 connected to the shaft 9 is taken out, whereby the disk 17 and its frame are free from shaft 9 owing to the separation of the lugs 16 thereof from the slots 20 of sleeve 19 secured to disk 17, though the latter is held in view of the lodging of one of the shoulders 27' or 28' in the recess 29' of plate 29, until the latter is pulled out with the fingers, it then being possible to take out the disk 17.

In order to operate the mechanism for indicating that the vehicle is to turn to the right or left, assuming that the indicating arrows are hidden inside the casing, the respective button 80 bearing against the end wall 81 is pressed against tension of spring 74, thus introducing still farther the pawl 78 which thereby lets free the pawl 53 of stem 52, the spring 69 pushing out in this movement the plunger 51 and the arrow-shaped casing 54, and the plate 61 comes immediately in contact with button 64, and thereby an electric circuit is established through the conductors 65 whereby the electric lamp 60 is lighted.

If it is not desired to light the lamp 60, it is only necessary to disconnect the button 64 from the plate 61 by separating it from its pass.

In order to introduce the indicating arrows, the butt 70 fixed to the plunger 51 is manually actuated in such a manner as to slide same along the slot 48 until the pawls 78 and 53 of stems 77 and 52 may engage.

What I claim is:

1. In a traffic signaling device, a casing having an opening in one wall and also having an opening in the opposite wall and a removable closure for the last named opening; a shaft mounted for rotation in bearing openings in the first-named wall and said closure, a signal-bearing disk on said shaft, and means detachably secured on the ends of the shaft to hold the closure in place and prevent casual endwise movement of the shaft.

2. In a traffic signaling device, a casing having an opening in one wall and also having an opening in the opposite wall, and a removable closure for the last-named opening, said closure also having an opening, a shaft mounted for rotation in the first-named wall and in said closure, a signal-bearing disk on said shaft, near said wall, and indicating arms on said shaft and near said closure.

3. In a traffic signaling device, a casing having a display opening, a signal-bearing disk mounted for rotation in the casing and having a flange ring on its rear side, said flange ring forming a spring and being provided with bent portions forming stop shoulders, and a spring plate secured in the casing and having a recess for engagement by either of said stop shoulders.

In witness whereof I affix my signature.

JESUS B. MUÑIZ.